Patented Oct. 3, 1944

2,359,381

UNITED STATES PATENT OFFICE 2,359,381

COMPOUNDS OF THE ANTHRAQUINONE SERIES

Melvin A. Perkins, Wilmington, Del., and Joseph Deinet, Glassboro, N. J., assignors to E. I. du Pont de Nemours & Company, Wilmington, Del., a corporation of Delaware No Drawing. Application June 19, 1941,
Serial No. 398,760

5 Claims. (Cl. 260—378)

This invention relates to the preparation of new compounds of the anthraquinone series. The invention relates more particularly to the preparation of new compounds of the anthraquinone series that are useful for the dyeing of cellulose acetate silk, and as intermediates for the preparation of other anthraquinone dyes.

A large number of compounds of the anthraquinone series, particularly those containing amino and alkylamino groups, have been found to be suitable for the dyeing of cellulose acetate and related fibers, but in general, the compounds of the anthraquinone series that are used for this purpose are not dyes for fibers such as cotton, wool and silk or regenerated celluloses but are so-called intermediates which are used in the preparation of dyes for such fibers. In general the aminoanthraquinones and alkylaminoanthraquinone compounds which have been found useful for the dyeing of cellulose acetate silk exhibit deficiencies when applied to that fiber particularly in regard to atmospheric fading and they often lack the necessary affinity to permit them to build up in strong shades without crocking.

It is an object of this invention to provide dyes of the anthraquinone series for dyeing cellulose acetate silk which have good tinctorial power and therefore the ability to build up into deep shades and exhibit good fastness properties. It is a further object to provide a series of cellulose acetate dyes which show exceptional resistance to atmospheric fading. It is a still further object of the invention to prepare new cyanoalkylamino-anthraquinones which may be used as intermediates for the preparation of other dyestuffs.

The new cyano-alkylamino-anthraquinones of this invention can be produced by condensing halogen or hydroxy-anthraquinone compounds or anthraquinone-sulfonic acids with cyano-alkylamines, or when there are two or more negative groups to be substituted on the anthraquinone nucleus with a mixture of cyano-alkylamines and other alkyl- or aryl-amines to give cyano-alkylamino-anthraquinones or mixed cyanoalkylamino- and alkyl- or aryl-amino-anthraquinones. These new compounds dye cellulose acetate silk and related fibers in bright shades ranging from red to greenish-blue and exhibit good fastness properties especially to light, with those carrying the cyano group in the beta position on the alkyl chain relative to the amino group exhibiting particularly good fastness to atmospheric fading. The cyano-alkylamines employed may be any of those alkyl compounds containing the cyano- and amino-groups attached to different carbon atoms such as beta-cyano-ethylamine and higher homologues thereof of the general formula

$$NH_2(CH_2)_n-CN$$

in which $n$ stands for a numeral from 2 to 10, inclusive, and wherein one hydrogen on the $CH_2$ group may be further substituted by an alkyl radical of not more than 3 C-atoms or by a —$CH_2CN$ radical.

The alkylamines that may be introduced into the anthraquinone nucleus, in addition to the cyanoalkylamino groups, may include the hydroxy-substituted alkylamines such as ethanolamine, methanolamine, etc. The arylamino groups that may be present are preferably those of the benzene series, and such arylamino groups may contain simple monovalent substituents as more particularly illustrated in the prior art for the arylaminoanthraquinones used as acetate silk dyes or in the form of sulfonic acids as wool and silk dyes.

These new cyanoalkylamino-anthraquinones exhibit increased tinctorial power and ability to build up to deeper shades than the corresponding straight alkylamino-anthraquinones and those carrying the cyano group in the beta position on the alkyl chain also exhibit an unusual and unforeseen resistance to atmospheric fading when dyed on cellulose acetate silk, which resistance is almost entirely lacking in cases of the simple alkylamino-anthraquinones.

The following examples are given to illustrate the invention. The parts used are by weight.

Example 1

A mixture of 30 parts of 1-methylamino-4-bromoanthraquinone and 0.2 part of copper acetate is slurried in a solution of 77 parts of epsilon-amino-capronitrile ($H_2N(CH_2)_5CN$) in 50 parts of nitrobenzene. The reaction mass is heated at 70 to 80° C. for 24 hours, then cooled to 10° C., filtered, and the blue crystals washed with methanol.

1-methylamino-4-cyano-pentyl-aminoanthraquinone, melting at 134° C., is obtained in good yield. The product yields brilliant blue dyeings on cellulose acetate and has excellent affinity and light fastness.

Example 2

75 parts of n-propyl alcohol, 50 parts of quinizarine, 150 parts of water, 28 parts of epsilon-amino-capronitrile and 39 parts of 20% mono-methylamine (aqueous solution) are heated together in a closed flask to 75 to 80° C. and maintained at that temperature for 24 hours. The mass is then cooled and stirred for 20 hours at room temperature, then filtered, washed with 40% methanol and dried at room temperature. The product obtained is a mixture containing 4-cyano-pentyl-amino-1-methylaminoanthraquinone. It dyes acetate silk in very bright blue shades of excellent fastness to light.

*Example 3*

120 parts of iso-butyl alcohol, 20 parts of quinizarine, 20 parts of leuco-quinizarine, and 56 parts of epsilon-amino-capronitrile are heated together in a closed flask to 75 to 80° C. and maintained while agitating for 12 hours. The mass is then cooled, filtered and washed with 40% methanol. The product obtained (1:4-dicyano-pentyl-amino-anthraquinone) dyes acetate silk in very bright blue shades (green cast) of excellent fastness to light.

*Example 4*

150 parts of iso-butyl alcohol, 50 parts of quinizarine, and 50 parts of epsilon-amino-capronitrile are heated together in a closed flask at 80 to 85° C. while agitating for 12 hours. The mass is then cooled to 22° C. filtered and washed with 40% methanol. The product obtained (1-cyano-pentylamino - 4 - hydroxy-anthraquinone) dyes acetate silk in violet blue shades of good fastness to light.

*Example 5*

75 parts of n-propyl alcohol, 50 parts of quinizarine, 150 parts of water, 16 parts of 28% ammonia and 28.2 parts of epsilon-amino-capronitrile are heated together in a closed flask at 85–90° C. while agitating for 20 hours. The mass is poured into 1000 parts of water, let stand for several hours, until the mass becomes brittle. Then it is filtered, washed with water and dried at room temperature. The product obtained (1-cyano-pentyl-amino-4 - amino - anthraquinone) dyes acetate silk in pure blue shades somewhat redder than those of Examples 1 and 2.

*Example 6*

125 parts of iso-butyl alcohol, 12.5 parts of 1:4:5:8-tetra-hydroxy-anthraquinone, 12.5 parts of leuco-1:4:5:8-tetra-hydroxy - anthraquinone and 46 parts of epsilon-amino-capronitrile are heated together at 110° C. in a closed flask for 24 hours. Then the mass is poured into 1000 parts of water and let stand for several hours until it becomes brittle. The solid is then filtered, washed with water and dried at room temperature. The product obtained (1:4-dicyano-pentylamino-5:8-dihydroxy - anthraquinone) dyes acetate silk in blue-green shades of good light fastness.

*Example 7*

200 parts of n-propyl alcohol, 25 parts of quinizarine, 25 parts of leuco-quinizarine, 25.2 parts of aniline and 30.3 parts of epsilon-amino-capronitrile are heated together in a closed flask at 95 to 98 C. for 20 hours. Then the mass is cooled to 25 C., and poured into 1000 parts of water. After filtration, the cake is suspended in 250 parts of methanol and 500 parts of water, 10 parts of 30% sodium hydroxide are added and the slurry stirred for several hours, then filtered, washed free from alkali and dried at room temperature. The product obtained (1-cyano-pentylamino-4-anilino-anthraquinone) dyes acetate silk in pure blue shades of good light fastness.

*Example 8*

200 parts of n-propyl alcohol, 25 parts of quinizarine, 25 parts of leuco-quinizarine, 30.7 parts of m-amino-benzyl alcohol and 28.4 parts of epsilon-amino-capronitrile are heated together in a closed flask at 95 to 98° C. and maintained for 20 hours while agitating. The reaction mixture is cooled to 25° C. and allowed to stand for 48 hours after which it is filtered. The cake is suspended in 250 parts of methanol and 500 parts of water. 20 parts of 30% sodium hydroxide are added and the slurry is heated to 40° C. and stirred for several hours, let cool to 25° C., filtered, washed free from alkali and dried at room temperature. The product obtained (1-cyano-pentylamino-4-m-methylol - anilino - anthraquinone) dyes acetate silk in bright blue shades of good light fastness and has excellent affinity and penetration.

*Example 9*

75 parts of n-propyl alcohol, 25 parts of quinizarine, 50 parts of water, 14 parts of epsilon-amino-capronitrile and 8.7 parts of beta-amino-propionitrile (cyano-ethylamine) are heated together in a closed flask to 75 to 80° C. and maintained for 48 hours while agitating. After cooling to 25° C., the mass is poured into 1000 parts of water and let stand until the solid becomes brittle, then is filtered, washed with water, and dried at room temperature. The product obtained (1-cyano-pentyl-amino-4-cyanoethylamino-anthraquinone) dyes acetate silk in pure blue shades of good light fastness.

*Example 10*

75 parts of n-propyl alcohol, 25 parts of quinizarine, 50 parts of water, 19.5 parts of 20% mono-methylamine (aqueous solution) and 8.7 parts of beta-amino-propionitrile are heated together in a closed flask to 75 to 80° C. and maintained for 48 hours. After cooling the mass to 22° C., it is filtered, washed with 40% methanol and dried at 50° C. The product obtained (1-methylamino-4-cyano - ethylamino - anthraquinone) dyes acetate silk in bright blue shades of good light fastness.

*Example 11*

A suspension of 24 parts of leuco quinizarine in 75 parts of n-propyl alcohol, 75 parts of water and 35 parts of beta-amino-propionitrile (cyano-ethylamine) is heated, with stirring to 70 to 75° C. After 24 hours, the dark olive solid is filtered off at 45° C., washed with 50% methanol and dried. The bronzy leuco compound thus obtained is oxidized by heating under agitation at 180° C. for 4 hours in about four times its weight of nitrobenzene. Brilliant crystals are obtained from the nitrobenzene upon cooling. Nitrogen analysis (16.2%) shows the product to be practically pure 1:4-di(beta-cyano-ethylamino)-anthraquinone (theory demands 16.28% N). It melts at 255° C. and dyes cellulose acetate in bright blue shades of unusually good fastness to light and atmospheric fading.

*Example 12*

50 parts of 1-amino-4-bromo-anthraquinone-2-sulfonic acid (Na salt) are suspended in 750 parts of water, 25 parts of sodium carbonate, 50 parts of epsilon-amino-capro-nitrile and one part of copper acetate are added. The mass is then heated to 65° C. and maintained for 2 hours. Thereafter 100 parts of sodium chloride are added. The salted mixture is cooled to 30° C., filtered and washed with (15%) sodium chloride solution until free from alkali. The product obtained dyes wool from an acid bath in bright blue shades.

The wool dye is desulfonated by the following procedure:

The above cake is then suspended in 3000 parts of water, 60 parts of dextrose are added, the mass heated to 95° C. and 60 parts of sodium hydroxide dissolved in 500 parts of water are slowly added (in about ½ hour). The mass is then cooled to 25° C., filtered and washed free from alkali. The product obtained dyes acetate silk in bright blue shades (very red cast) of good fastness properties.

*Example 13*

100 parts of 1-chloro-anthraquinone are suspended in 200 parts of n-propyl alcohol. 50 parts of potassium-acetate, 2 parts of copper acetate and 150 parts of epsilon-amino-capronitrile are added. The mass is then heated to 105° C. and maintained for 12 hours, then cooled to 25° C., 1000 cc. of water are slowly added, the precipitate filtered off and washed free from salt and alkali. The product obtained dyes acetate silk in bright red shades (blue cast) of good fastness properties.

*Example 14*

38 parts of n-propyl alcohol, 25 parts of quinizarine, 75 parts of water, 21 parts of omega-amino-capric nitrile ($H_2N(CH_2)_9CN$) and 19.5 parts of 20% mono-methylamine are heated in a closed flask to 80 to 85° C. and maintained for 22 hours. The tacky mass is poured into 1000 parts of water. After standing, the mass becomes brittle; then it is filtered off and dried at low temperature. The product obtained dyes acetate silk in bright blue shades.

*Example 15*

Five parts of beta-amino-propionitrile are added to a suspension or solution of 4.5 parts of leuco-1:4:5:8-tetra-hydroxy-anthraquinone in 32 parts of n-propyl alcohol and 30 parts of water. After heating to reflux, 5 parts of boric acid are added and the mass refluxed for 4 hours. The reaction product is isolated by cooling, filtering and washing with 50% aqueous methanol. A blue solid is obtained in excellent yield. Upon oxidation, for example by boiling with nitrobenzene for two hours, a bright greenish-blue acetate silk dye is obtained. It melts at 326° C. and gives a brownish-red solution in cold 80% sulfuric acid. Its nitrogen content corresponds to that required for 1:4-di(beta-cyano-ethylamino)-5:8-dihydroxy-anthraquinone and dyeings thereof show unusually good fastness properties.

If leuco-1,4,5-trihydroxy-anthraquinone is substituted for the leuco-1,4,5,8-tetrahydroxy-anthraquinone in this example, using otherwise similar reaction conditions, 1,4-di(betacyano-ethylamino)-5-hydroxy-anthraquinone is obtained which dyes cellulose acetate in similar shades. By omitting the boric acid, products containing approximately one cyano-ethylamine radicle per anthraquinone nucleus are obtainable.

We claim:

1. 1,4-di(omega-cyanoalkylamino)-anthraquinones in which the alkyl group in each instance is a straight chain alkyl group of two to five carbon atoms, which carry in the 5- and 8-positions a substituent of the group consisting of H and OH.

2. 1,4-di(beta-cyanoethylamino)-anthraquinones which carry in the 5- and 8-positions a substituent of the group consisting of H and OH.

3. 1,4-di(beta-cyanoethylamino)-5-hydroxy-anthraquinone.

4. 1,4-di(beta-cyanoethylamino)-anthraquinone.

5. 1,4-di(epsilon-cyanopentylamino)-anthraquinone.

MELVIN A. PERKINS.
JOSEPH DEINET.